Nov. 4, 1941.   L. G. TOWNSEND   2,261,192
METHOD AND APPARATUS FOR ELECTRO-OPTICALLY MEASURING AREAS
Filed May 20, 1940   3 Sheets-Sheet 1

INVENTOR.
LEONARD G. TOWNSEND
BY
ATTORNEYS.

Nov. 4, 1941.                L. G. TOWNSEND                2,261,192
             METHOD AND APPARATUS FOR ELECTRO-OPTICALLY MEASURING AREAS
                    Filed May 20, 1940          3 Sheets-Sheet 2

INVENTOR.
LEONARD G. TOWNSEND
BY
ATTORNEYS.

Nov. 4, 1941.  L. G. TOWNSEND  2,261,192
METHOD AND APPARATUS FOR ELECTRO-OPTICALLY MEASURING AREAS
Filed May 20, 1940  3 Sheets-Sheet 3
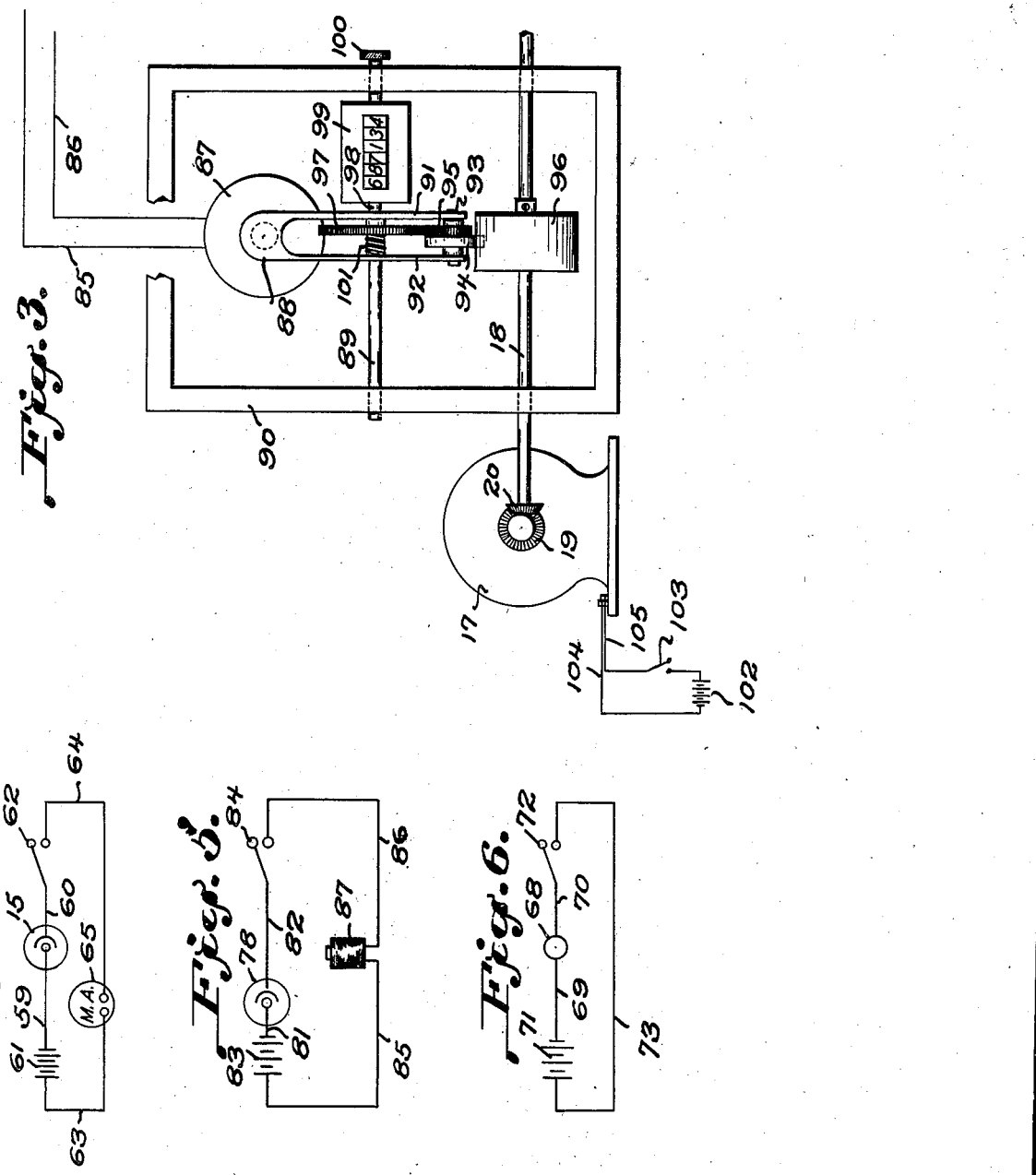
INVENTOR.
LEONARD G. TOWNSEND
BY
ATTORNEYS.

Patented Nov. 4, 1941

2,261,192

UNITED STATES PATENT OFFICE 2,261,192

METHOD AND APPARATUS FOR ELECTRO-OPTICALLY MEASURING AREAS

Leonard G. Townsend, Washington, D. C.

Application May 20, 1940, Serial No. 336,218

4 Claims. (Cl. 33—123)

(Granted under the act of March 3, 1883, as amended April 30, 1928; 370 O. G. 757)

This invention relates to methods of an apparatus for measuring regular or irregular areas of a plane surface of graduated or contrasting shades, and more particularly to combined optical and electrical methods and apparatus for recording the total number of elemental areas of a selected shade or density appearing on a chart, map, or photograph. In the more conventional types of apparatus for measuring regular or irregular-shaped areas of charts, maps and the like, much close accurate hand operation is required and the results are not always all that is to be desired.

The conventional types of planimetering instruments operate on the principle of a sensing wheel being moved at various angles to its axis of rotation thus employing slippage on the surface being measured, as one of its factors of sensitivity. As this slippage differs somewhat with the type of surface being operated upon, and also varies with the moisture content of the material being measured, these types of devices are often quite inaccurate. The present invention overcomes these objections and at the same time eliminates the tedious hand operation necessary in using the conventional planimetering device.

The present invention employs the different light transmitting or reflecting properties of a chart, photograph or map having areas of different densities or of differing light reflecting properties. In the practice of the invention the chart, photograph or map is illuminated, and the transmitted or reflected components of light therefrom are picked up by a light sensitive cell which at any one instant receives the light issuing from only one elemental or unit area thereof. During successive intervals of time light is picked up from other elemental or unit areas of the total area of the chart or map being scanned until each and every elemental area thereof has been caused to effect the photo-sensitive cell.

While the scanning of the chart is taking place the current in the photo-sensitive cell is varried in accordance with the incident light on the cell. As the incident light on the cell is proportional to the shade or density of the elemental areas being scanned, it follows that the current in the photo-sensitive cell at any instant is proportional to the shade or density of the area being scanned.

The varying current in the photo-sensitive cell is used to vary the deflection of a galvanometer which in turn controls and determines whether or not light from a constant source is allowed to fall on a second photo-sensitive cell. The second photo-sensitive cell may be selectively positioned so that light will fall thereon only when the galvanometer is displaced a maximum, or it may be so placed that light will fall thereon with a lesser galvanometer displacement. In response to light on the second photo-sensitive cell a counter-mechanism is rendered operative to add one elemental or unit area to the total count of unit areas each time the said cell is energized for a length of time corresponding to that required to scan that elemental area. As the whole surface is scanned, all elemental areas having a predetermined shade or any lighter shade are counted. By a different setting of the position of the said second photo-sensitive cell it is possible to remeasure the area of lighter gradation, and by subtracting this area from the value previously obtained when all areas above a certain light reflective or transmitting quality are measured, it is possible to determine the various total numbers of unit areas on a surface of various light reflecting or light transmitting qualities. For instance, a chart or photograph having areas ranging from black to white can be measured by setting the apparatus to count all elemental areas that transmit or reflect any light. The difference between the areas counted and the total area of the surface represents that part that is absolutely black. Next, the chart or surface can be measured to determine the total area of the all-white portions thereof. The total area of the intermediate portions can be computed by subtratcing from the total known area of the chart the combined totals representing the black and the white areas. By appropriate adjustment all areas that are medium gray or dark gray, or the like, can be computed.

The principal object of this invention is to provide electro-optical methods and means for automatically measuring and recording regular or irregular areas of a selected light absorbing or light transmitting character on a sheet or surface having the areas to be measured intermixed with other areas. More specifically, it is an object of this invention to automatically calculate and record the total number of unit areas of an aerial photograph or map corresponding in color or density to such areas as forest, water, fields of grain, etc.

Other objects and advantages will appear from the more detailed description of the invention following hereinafter taken in conjunction with the accompanying drawings, wherein—

Fig. 3 is a side view of the registering portion of the machine showing the registering counter and associated apparatus.

Fig. 4 is a circuit diagram showing the complete circuit of the photo-sensitive cell included in the scanning mechanism of Fig. 1.

Fig. 5 is a circuit diagram showing the complete circuit of the photo-sensitive cell included in the analyzing mechanism shown in Fig. 2.

Fig. 6 is a circuit diagram of the light source included in the analyzing mechanism of Fig. 2.

Figure 1:
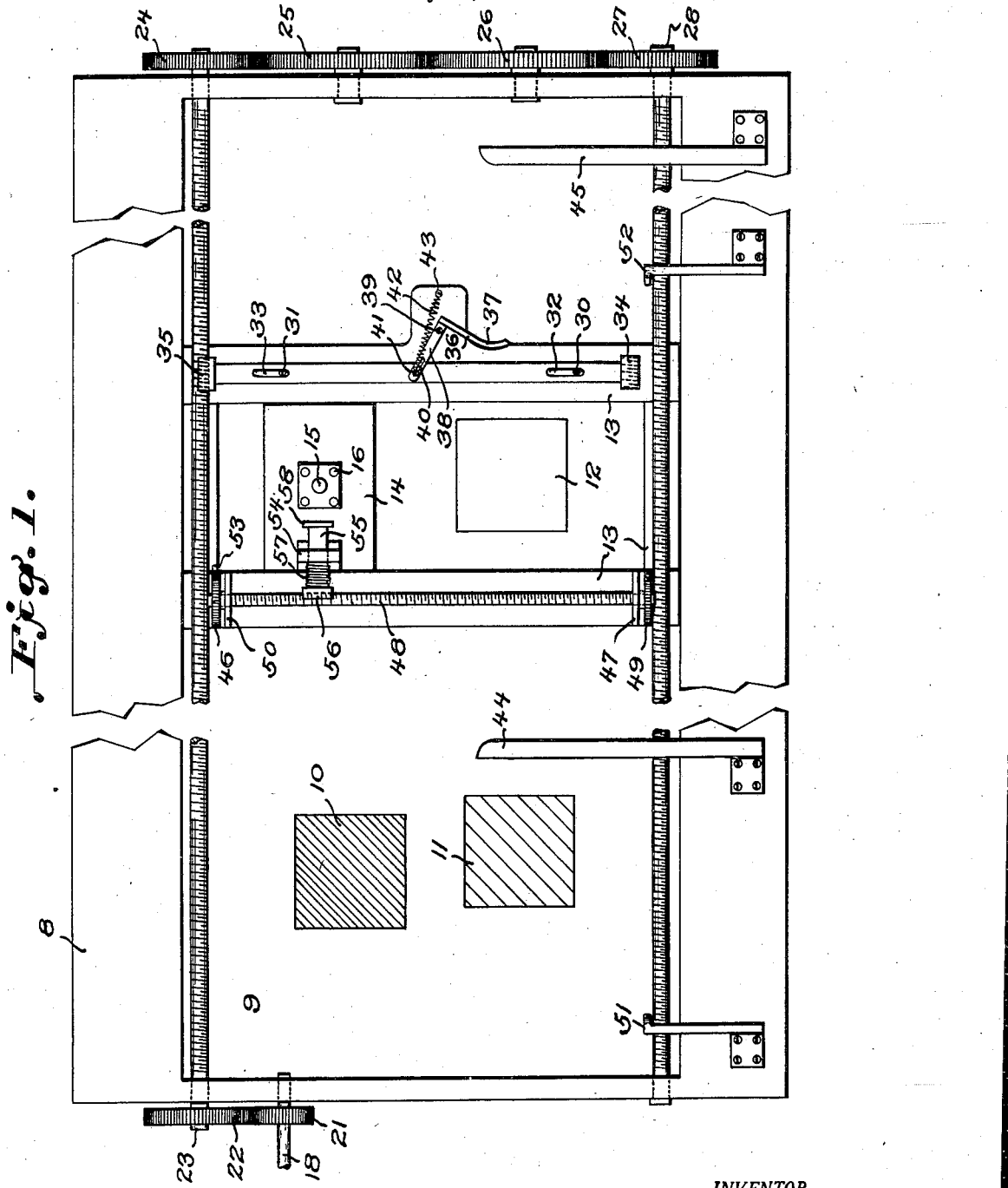
Fig. 1 is a top plan view of a preferred embodiment of the invention showing the mechanism for sensing or scanning a picture or map carried on the platen or bed.

Referring more particularly to the drawings wherein like numerals designate similar parts in the various views, 8 is the main frame member provided with a recess. The bottom 9 of this recess is the platen or bed upon which a chart, photograph or map having areas to be measured is placed. The sheet carried on the platen 9 may be black and white only, or of varying light reflective quality having areas reflecting little light such as area 10 or areas of progressively greater light reflecting qualities such as areas 11 and 12, respectively.

A longitudinally reciprocable rectangular frame member 13 is slidably mounted within the recess in the main frame 8. A transversely reciprocable frame member 14 is slidably mounted within the rectangular opening in the longitudinally reciprocable frame member 13. Centrally mounted on the frame 13 is a photo-sensitive cell 15 surrounded by light sources 16. The light sources 16 are arranged to direct light downwardly on to the surface to be scanned while the photo-sensitive cell 15 is arranged to receive light from an almost infinitesimally small area (unit area or elemental area) on said surface.

The frame members 13 and 14 are adapted to be moved within their respective paths by the motor 17 which drives shaft 18 through the linkage of the beveled gears 19 and 20 (Fig. 3). A gear 21 is mounted on shaft 18 (Fig. 1) and this gear meshes with gear 22 which is mounted on shaft 23 journaled in the main frame 8. The shaft 23 extends through the recessed portion of the frame 8 and carries on its end opposite to gear 22 a gear 24 which meshes with gear 25 which in turn meshes with gear 26 which drives gear 27 mounted on shaft 28 journaled in the main frame and extending through the recessed portion thereof parallel to shaft 23 and on the opposite side of the recess in the main frame 8. Shafts 23 and 28 are threaded on that portion of each that lies within the recessed portion of the main frame 8.

Member 29 is slidably mounted on the frame member 13 by means of pins 30 and 31 fixed to the frame member 13 and extending through the slots 32 and 33, respectively, provided in member 29. The ends of member 29 are provided with threaded shoes or screw followers 34 and 35. The threaded shoe 34 is adapted to engage the threads on shaft 28 when the member 29 is displaced downwardly away from the position in which it is shown in Fig. 1. The threaded shoe 35 engages the threads on shaft 28 when the member is in the position shown in Fig. 1.

A bell crank lever 36 having a downwardly extending portion 37 and a laterally extending portion 38 is pivotally mounted on an extended portion of the frame 13 by means of the pin 39. The portion 38 of the bell crank is provided with a longitudinal slot 40 within which the pin 41 mounted on the member 29 extends. An over-center tension spring 42 is attached at one end to the portion 38 while the other end of this spring is attached to a pin 43 mounted on the frame member 13 behind the pin 39 at a point on the line established by the laterally extending portion 38 of the bell crank lever when it is in its median position.

The downwardly projecting portion 37 of the bell crank lever 36 is adapted to be engaged and moved to the right by the stop member 44 extending from the main frame 8 when the longitudinally reciprocable frame 13 is displaced sufficiently far to the left. When the frame 13 is displaced sufficiently far to the right the downwardly projecting portion 37 of the bell crank lever 36 is engaged by and moved to the left by the stop member 45 extending from the main frame. As the bell crank 36 is moved counterclockwise by stop member 44 the member 29 is moved downwardly withdrawing the threaded shoe 35 from engagement with threaded shaft 23 and engaging threaded shoe 34 with threaded shaft 28. Thus, as long as shafts 23 and 28 revolve the frame 13 is driven first from one end of the recess in frame 8 to the other whereupon the motion is reversed with the change of position of member 29 and the cycle repeats itself thus moving the photo-sensitive cell 15 back and forth longitudinally of the surface being scanned.

The longitudinally reciprocable frame member 13 is provided with upstanding bearing members 46 and 47 in which a shaft 48 is journaled. The shaft 48 is provided with ratchet wheels 49 and 50 keyed thereto. Two spring pawls 51 and 52 mounted on the main frame 8 are associated with ratchet wheel 49. Pawl 51 is arranged to engage the ratchet wheel 49 below its center and to rotate the ratchet wheel 49 one tooth each time the frame member 13 is carried to the extreme lefthand position. Pawl 52 is arranged to engage the ratchet wheel 49 above its center and to rotate the ratchet wheel in the same direction as pawl 51, one tooth each time the frame member 13 is carried to the extreme righthand position. A click pawl 53 is associated with the ratchet wheel 50 to prevent rotation backwards of the shaft 48 after it has been rotated by either pawl 51 or 52.

The shaft 48 is threaded between the bearings 46 and 47 and when rotated as previously described acts to drive the frame member 14 a step at a time at right angles to the direction of movement of frame 13. This movement is accomplished by the means to be described immediately below.

The frame 14 is provided with an upstanding projection 54 provided with an opening in which the retractible member 55 is adapted to slide. A threaded shoe or screw-follower 56 is attached to the end of the retractable member 55 adjacent to the screw 48. A compression spring 57 bearing against the screw follower 56 and the upstanding projection 54 is provided to normally hold the screw-follower 56 in engagement with the screw 48. The end of the retractable member 55 is provided with a knob or handle 58 by means of which the screw follower 56 may be retracted from engagement with the screw 48 for setting the frame 14 to its initial or starting position.

The photo-sensitive cell 15 shown in Fig. 1 is connected by way of conductors 59 and 60 to one terminal of a source of potential 61 and one terminal of a switch 62, respectively (see Fig. 4). The other terminals of the source of potential 61 and the switch 62 are connected by conductors 63 and 64, respectively, to the terminals of galvanometer 65 (see Fig. 2).

Figure 2:
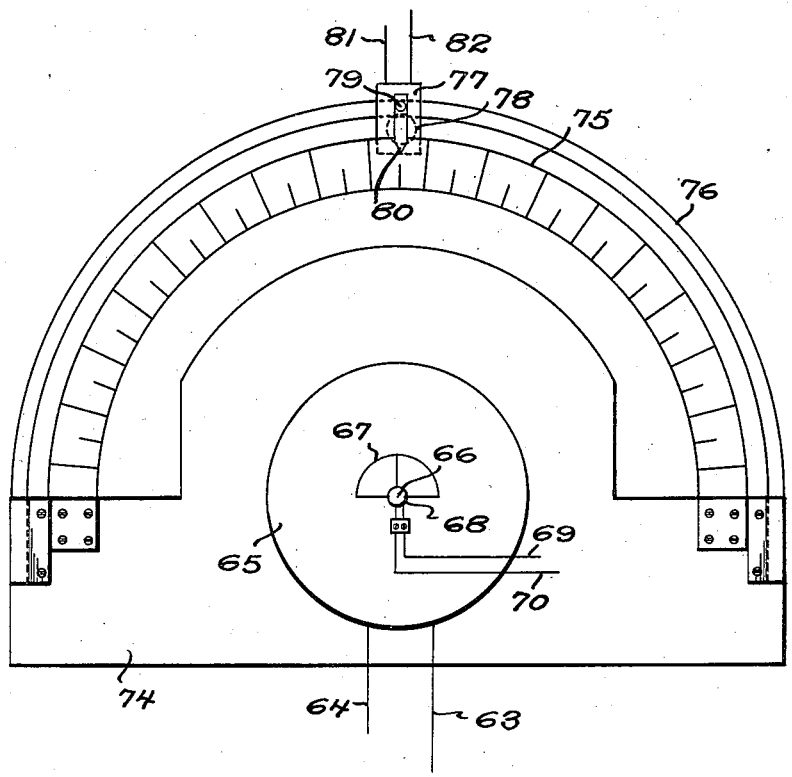
Fig. 2 is a top plan view of the analyzer or selector mechanism by means of which the different densities may be selected.
Figure 7:
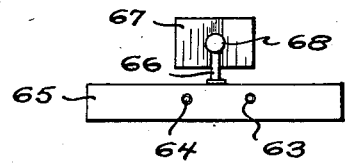
Fig. 7 is a side elevation of the analyzing or selecting mechanism shown in Fig. 2.

The shaft 66 of the galvanometer 65 carries a hemi-cylindrical drum 67. The drum 67 is mounted on the shaft of the galvanometer so as to be rotated about its axis with displacement of the galvanometer shaft. During such times as no current is flowing in the circuit of galvanometer 65 the drum 67 occupies the position shown in Fig. 2. At the center of the drum 67 there is mounted a light source 68 which may be any kind of a light source that is uniform in character. In Fig. 2 the light source 68 is shown as an electric lamp having connected thereto conductors 69 and 70. The conductors 69 and 70 are connected to one terminal of a source of potential 71 and a switch 72, respectively (see Fig. 6). The other terminals of the source of potential 71 and the switch 72 are connected together by conductor 73 so that when the switch 72 is closed the light source 68 is energized.

The galvanometer 65 is mounted upon the frame 74 of the analyzer mechanism shown in Fig. 2. An arcuate scale 75 is mounted on the frame 74 of the analyzer concentric with the axis about which the drum or shutter 67 rotates. The arcuate scale 75 may be graduated in any desired manner to detect the various gradations of shading in the map or the like that it is desired to measure. An arcuate support 76 is also mounted on the frame 74 of the analyzing device concentric with the arcuate scale. A photosensitive cell support 77 carrying a photo-sensitive cell 78 is slidably mounted on the arcuate support 76. The support 78 may be slid to any desired point on the arcuate support 76 and locked at a selected position by means of any appropriate locking device such as a set screw shown at 79. The support 77 also carries a pointer 80 lying above and cooperating with the graduated scale 75 to indicate the exact position to which the support 77 and the photo-sensitive cell 78 is set in relation to analyzer frame 74. The photo-sensitive cell is connected to conductors 81 and 82. Conductors 81 and 82 are in turn connected to a source of potential 83 and a switch 84, respectively (see Fig. 5). The other terminals of the source of potential 83 and the switch 84 are connected via conductors 85 and 86, respectively, to the terminals of an electromagnet (see Fig. 3). The electro-magnet 87 is provided with an armature 88 pivoted about a shaft 89 mounted in bearings in the frame 90. The armature 88 is mounted upon an armature frame having depending legs 91 and 92. The legs 91 and 92 of the armature frame are provided with a shaft 93 extending therebetween. A friction wheel 94 and a gear 95 are mounted on shaft 93 so as to turn together.

When the armature 88 is attracted by electro-magnet 87 and the armature frame including depending parts 91 and 92 are moved the friction wheel 94 is brought into engagement with the friction wheel or pulley 96 carried on shaft 18 thus turning the friction wheel 94 with the rotation of pulley or friction wheel 96. Within the armature frame 91—92 there is mounted a gear 97 meshing with gear 95. The gear 97 is mounted on shaft 98 connected to drive the counter 99. The counter 99 is provided with a reset handle 100 by means of which the counter may be reset.

When the electro-magnet 87 is de-energized the armature 88 is retracted by the spring 101 around the shaft 89 attached to a fixed sleeve on shaft 89 and to the armature frame portion 92. Thus the friction wheel 94 is removed from contact with the friction wheel or pulley 96 except at such times as the electro-magnet 87 is energized. During such times as the electro-magnet 87 is energized and friction wheel 94 bears against friction wheel 96 the revolutions of the friction wheel 94 are counted on the counter-mechanism 99 through the drive of gears 95 and 97 which drives the shaft 98 of the counter 99.

The motor 17 shown in Fig. 3 is driven by any appropriate source of potential such as the battery 102, switch 103 and appropriate conductors 104 and 105.

The operation of the system is as follows:

A chart, photograph, map or the like is first edited and then placed on the platen 9 (Fig. 1) and the frames 13 and 14 are retracted to their initial positions so that the photo-sensitive cell 15 occupies a position above the upper lefthand portion of the platen. The frame 14 is moved upwardly by hand after the knob 58 has been moved to the right removing the screw follower 56 from engagement with shaft 48. The frame 13 is moved to the left by hand while the member 36 and member 29 are held at their median positions, and the selector analyzer mechanism shown in Fig. 2 is set for the lightest shade appearing thereon. With the counter mechanism now set to zero and with the switches 62, 72, 84 and 103 closed, the motor 17 drives the shaft 18 causing the frames 13 and 14 to take up their respective scanning motions. During such times as the photo-electric cell 15 is above and in scanning relation to a dead black area no light is picked up by the photo-sensitive cell 15 for all practical purposes. During such times as it is scanning white areas a large amount of light is picked up thereby causing a current to flow in the circuit of photo-sensitive cell 15 and galvanometer 65 of such a value as to swing the drum 67 mounted on the shaft of galvanometer 65 to such a position that light from the source 68 will reach the photo-electric cell 78 irrespective of whether the cell 78 and its frame 77 are set to either of its extreme positions.

In the conditions assumed above, it is first desired to measure the lightest shade appearing on the map. The photo-electric cell 78 is set near the extreme righthand portion of the scale 75. Whenever the photo-sensitive cell 15 scans an elemental area of the lightest shade the galvanometer 65 is deflected to such a position that the drum 67 permits light from source 68 to fall upon the photo-sensitive cell 78. At such times as darker shades are being scanned (with the assumed setting of photo-sensitive cell 78), no light falls on the photo-sensitive cell 78 because the light source 68 is shielded by the drum 67. During such times as photo-sensitive cell 78 picks up light from the source 68 a current flows from the photo-sensitive cell 78 via conductors 81, 82 and battery 83, switch 84 and conductors 85 and 86 to the electro-magnet 87, energizing the electro-magnet 87. Upon the energization of the electro-magnet 87 (see Fig. 3) the armature 88 is attracted, moving the armature frame 91, 92 and the friction wheel 94 carried thereby so that the friction wheel 94 engages friction wheel or pulley 96, which is now being driven by motor 17 turning friction wheel 94, gear 95, gear 97, shaft 98 actuating counter 99 which registers one unit of area each time an elemental area of the proper shade is sensed by the photo-sensitive cell 15. During such times as the photo-sensitive cell 15 is sensing areas darker than the selected shade the electro-magnet 87 is not energized and the turning of drum 96 is without effect upon the friction wheel 94. When the entire picture or map on the platen 9 has been scanned for the lightest shade, the machine is stopped and the counter 99 now reads the total number of finite elemental areas of the lighter shade. In the event it is desired to measure the area of an intermediate shade the frame members 13 and 14 are moved to their initial positions as before, and the photo-sensitive cell 78 is moved to an intermediate position such as that shown in Fig. 2, for example. The machine is then put into operation and the map is scanned a second time. During this assumed condition of scanning areas as dark as 11 as well as areas that are as light as 12, are counted on the counter 99. When the whole map has again been scanned the total white area counted previously can be subtracted from the counter-reading attained in the second run and the areas having an intermediate shading such as area 11 are ascertained. By setting photo-sensitive cell 78 further to the left the area as dark in shade as area 10 may be measured in like manner. Where areas of a particular shade only are to be measured the selector analyzer photo-sensitive cell 78 is first positioned to respond to impulses arising from sensing a shade lighter than the one desired. After this scanning is completed, the analyzer photo-sensitive cell 78 is set for the shade it is desired to measure and the first reading subtracted from the second, as above, to obtain the measurement of the desired area. Another method of utilizing this device on aerial photographic maps would be to cut out by an electric needle or otherwise the area it is desired to measure, sort them into similar groups and lay these groups face down on a black background placed on the scanning platen 9 of the machine. For this method of operation the selector analyzer assembly shown in Fig. 2 will not be necessary: The leads 59 and 60 from the photo-sensitive cell 15 are connected through suitable amplifying means to the electro-magnet 87 and the white backs of the areas provide sufficient light to actuate the scanning photo-sensitive cell 15 and operate the electro-magnet 87 directly.

The above-described apparatus and method of operation are to be considered as representative only. Any desired form of two dimensional scanning such as that employed in picture transmission may be employed in lieu of that shown in Fig. 1. The photo-sensitive cell picking up light from the scanned surface may be moved with respect to the area scanned or the surface being scanned may be moved with respect to the photo-sensitive cell or these two parts may be maintained stationary with respect to one another and a moving point of light may be made to scan the area being measured. Instead of utilizing reflected light, transmitted light may be utilized if desired. This method is advantageous where it is desired to work directly from negative transparencies. Scanning apparatus of these various types are to be found in the class of telegraphy, the sub-classes on electro-optical transmission.

In Figs. 4 and 5 photo-sensitive cells are shown connected directly in circuit with the apparatus to be actuated. It is to be understood, however, that these photo-sensitive cells may be connected in the input circuits of suitable amplifiers and the devices controlled thereby may be connected at the output circuits thereof. It is to be further understood that the photo-sensitive cells may be photo-voltaic, photo-electronic, photo-resistive cells, or any other suitable type of photo-sensitive cell.

It is also to be understood that the counting mechanism shown in Fig. 3 may have substituted therefor any desired type of impulse counter. In this case the incident light picked up by the photo-sensitive cell 15 should be chopped to provide a discrete frequency either before or after the light impinges upon the surface being scanned. In this case impulse counters may be used directly without the necessity of linkage to a constantly rotating device such as is shown in Fig. 13.

Instead of selecting areas to be measured solely on the basis of the quantity of light transmitted or reflected thereby it is within the purview of my invention to make the desired selection by means of the color of the area being measured as when color photographs or colored maps are to have all areas of a particular color measured.

In the case where the selection is made on the basis of the color of the area being measured, the total area of the field having areas being measured can be illuminated with light of the particular color of the area being measured, when, for example, the surface of the earth is scanned directly from an elevated position natural illumination may be used and the particular color desired can be filtered therefrom before the light is passed to the photo-sensitive cell used in scanning.

Other and further obvious changes in the apparatus and method may be made within the purview of my invention.

The invention described herein if patented may be manufactured and used by or for the Government of the United States for governmental purposes without the payment to me of any royalty thereon.

I claim:

1. A device for measuring certain areas of a surface of varying light reflecting characteristics which comprises means for illuminating said surface, a photo-sensitive cell, means for gathering light from a relatively small unit area of said surface and directing it to said photo-sensitive cell, means for changing the unit areas of the surface selected until all unit areas of said surface have in turn been scanned by said photo-sensitive cell, and means including said photo-sensitive cell for registering the total number of unit areas of said surface from which said cell receives more than a predetermined amount of light, said last mentioned means including a galvanometer connected to be energized in accordance with the light incident on said photo-sensitive cell, a source of light, a second photo-sensitive cell, a shutter located between said source of light and said second photo-sensitive cell, said shutter being controlled in position by said galvanometer, a counter, and means responsive to the movement of said galvanometer to such a position that the shutter controlled thereby is moved to permit light to fall upon the said second photo-sensitive cell from said source for actuating said counter.

2. A device for measuring certain areas of a sheet of varying light absorbing qualities, comprising means for scanning said sheet, said means including a photo-sensitive cell and means for relatively moving said cell and said sheet to scan each and every unit area of said sheet by said photo-sensitive cell, a second photo-sensitive cell, means for energizing said second photo-sensitive cell at such times as said first cell receives more than a certain predetermined selectable quantity of light, a rotating shaft, a registering counter, and means responsive to the energization of said second photo-sensitive cell for driving said registering counter by said rotating shaft.

3. A device for measuring certain areas of a field having different light absorbing characteristics comprising means for optically scanning said field and setting up electrical currents varying in value as a function of the characteristics of the elemental areas of said field, means including a registering counter for registering an elemental area of said field each time that the electrical current set up in scanning an elemental area of said field exceeds a certain predetermined value, and adjustable means for selecting the predetermined value of current required for registering elemental areas, said means including a source of light, a photo-sensitive cell, means for normally masking the photo-sensitive cell from said source of light, means responsive to the electrical currents set up for positioning said masking means, and means for varying the position of said photo-sensitive cell.

4. The method of measuring the area of a particular color on a sheet having areas of different color which comprises illuminating said sheet with white light and optically scanning each and every unit area of said sheet, filtering the light received from said sheet and registering the total number of unit-size areas of said sheet from which light of a particular selected color is received during scanning.

LEONARD G. TOWNSEND.